United States Patent
Blum

(10) Patent No.: US 6,591,928 B1
(45) Date of Patent: Jul. 15, 2003

(54) HOVERCRAFT

(76) Inventor: Klaus Blum, Buhlgrabe 2, CH-8700 Kusnaeht (CH)

( * ) Notice: Subject to any disclaimer, the term of this patent is extended or adjusted under 35 U.S.C. 154(b) by 0 days.

(21) Appl. No.: 09/807,683

(22) PCT Filed: Oct. 16, 1998

(86) PCT No.: PCT/DE98/03086
§ 371 (c)(1),
(2), (4) Date: Apr. 25, 2001

(87) PCT Pub. No.: WO00/23309
PCT Pub. Date: Apr. 27, 2000

(51) Int. Cl.⁷ ................................................. B60V 1/14
(52) U.S. Cl. ........................................ 180/117; 180/118
(58) Field of Search ............................... 180/116, 117, 180/118, 119, 120, 123

(56) References Cited

U.S. PATENT DOCUMENTS

| 3,153,461 A | | 10/1964 | Bollum, Sr. | |
| 3,589,058 A | * | 6/1971 | Labat | 180/116 |
| 5,836,413 A | * | 11/1998 | Liao | 180/116 |
| 2001/0040062 A1 | * | 11/2001 | Illingworth | 180/117 |

FOREIGN PATENT DOCUMENTS

| DE | 2 147 302 | 9/1971 |
| DE | 2 162 599 | 12/1971 |
| DE | G 92 10 219.0 | 11/1992 |
| DE | 295 03 967 U1 | 8/1995 |
| DE | 197 25 740 A1 | 12/1998 |
| EP | 0 091 113 A1 | 12/1983 |
| FR | 2.118.850 | 12/1970 |
| GB | 1086919 | 10/1967 |
| WO | WO 85/05335 | 12/1985 |
| WO | WO 87/00492 | 1/1987 |

OTHER PUBLICATIONS

DE—Magazine "Hansa" —132 year 1995—No. 11, p. 37, 40.
GB—Magazine "Hoovering Craft and Hydrofoil" No. 7, Apr. 1978, p. 12.

* cited by examiner

*Primary Examiner*—Kevin Hurley
(74) *Attorney, Agent, or Firm*—Brooks & Kushman P.C.

(57) ABSTRACT

The invention relates to a hovercraft, comprising at least one fan for producing an air cushion, and at least one thrust unit, which acts on the top surface (4) of the craft and which is used to propel it and/or to control its direction. Both the fan and the thrust unit have at least one airscrew that is driven by means of a motor (5, 6, 21) and generates an air current. The motor takes the form of an electromotor (5, 6, 21) located directly on the airscrew. At least one central energy generator (7), which supplies the electromotor (E1, E2, A) with driving energy via an energy line (5a, 6a, 21a), is provided in order to generate the electrical driving energy required by said electromotor (E1, E2, A).

15 Claims, 4 Drawing Sheets

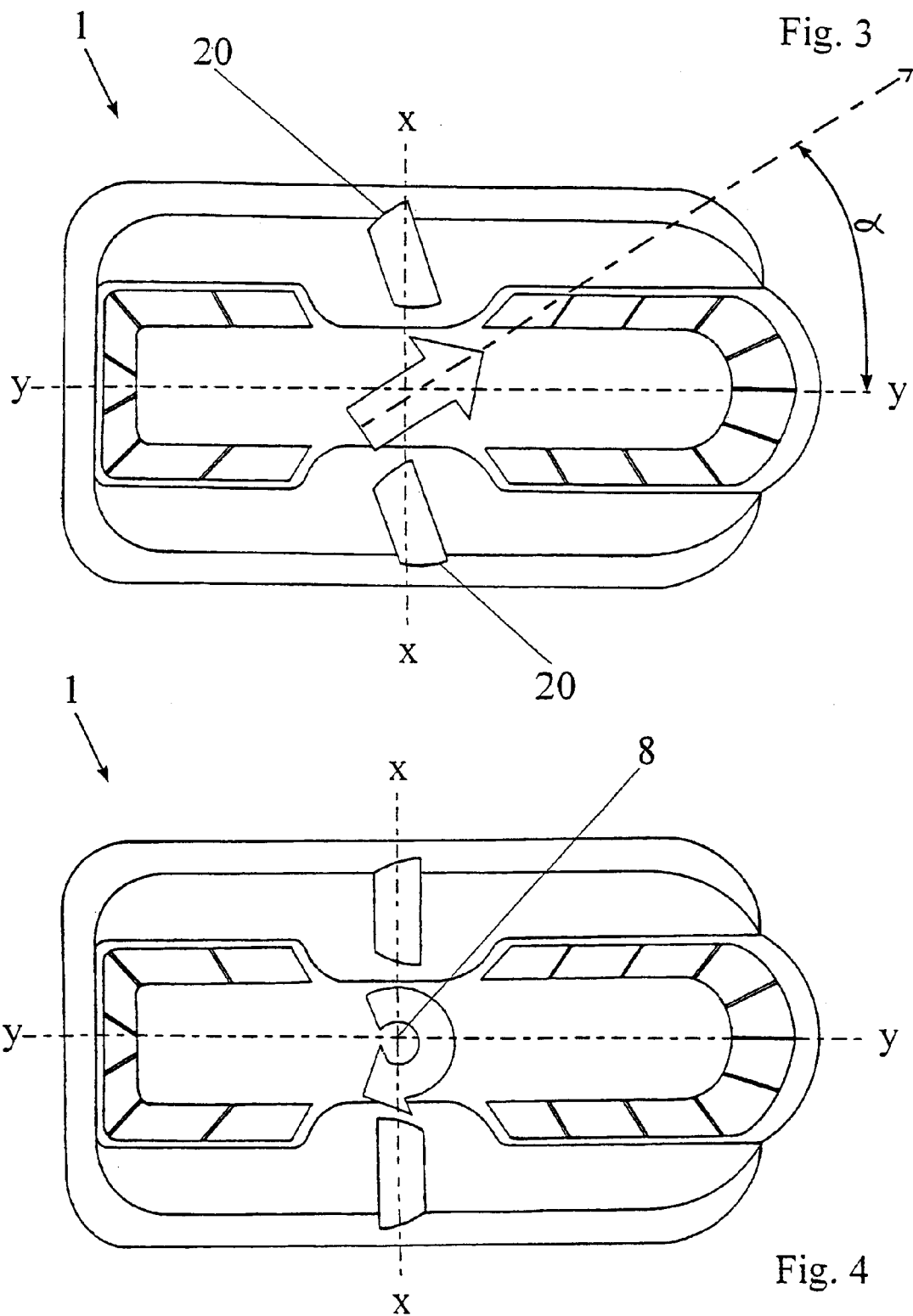

HOVERCRAFT

Figure 1:
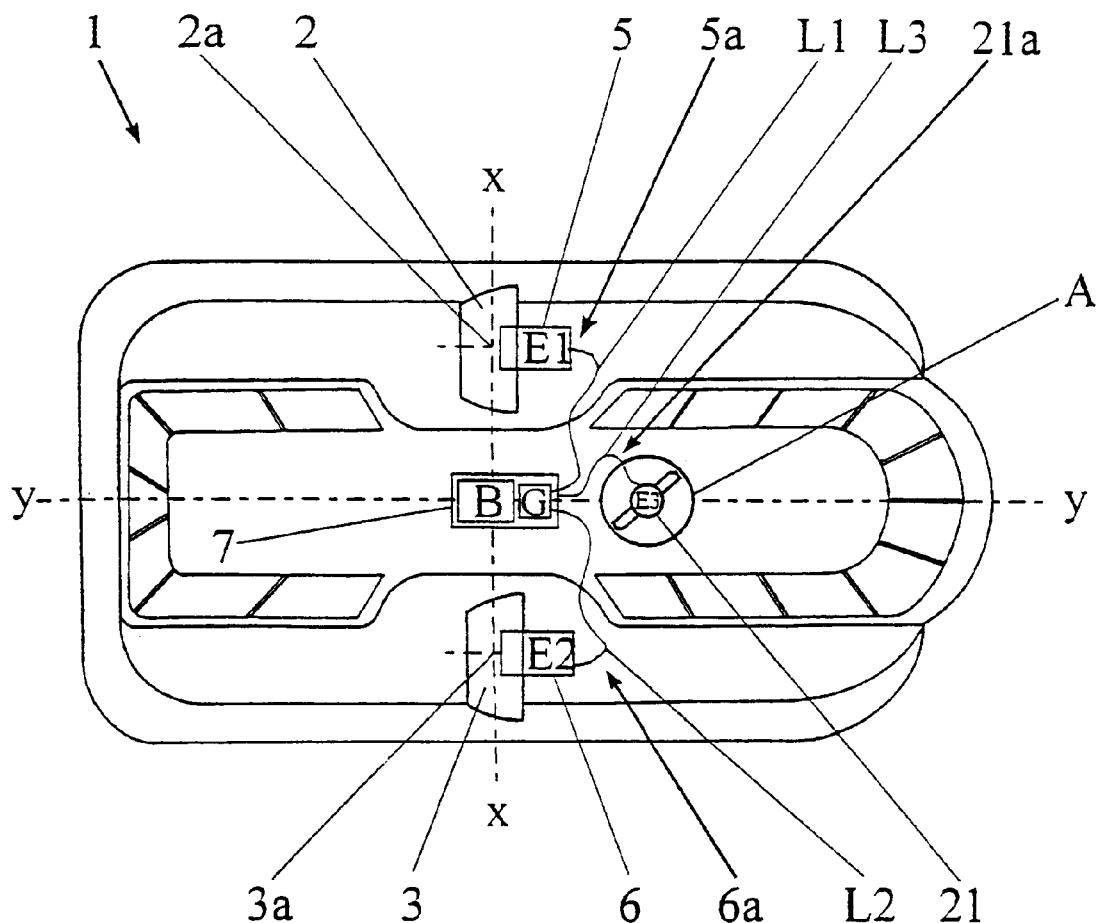

The invention relates to a hovercraft with at least one lift fan for producing an air cushion and at least one thrust unit, which acts on the top surface of the craft, where the thrust unit serves to propel the craft and/or control its direction, and both the lift fan and the thrust unit have at least one airscrew that is driven by means of a motor and generates an air current.

All known hovercraft designs are very heavy. Moreover, the weight is distributed unevenly over the craft as a result of its design or operation. In this type of craft, however, uniform weight distribution is of particular importance, as a poorly balanced hovercraft can easily transition from an ideal hovering state to unsteady behaviour. Uneven weight distribution must then be corrected by a complex and heavy ballast system.

In known hovercraft of the type described, particularly relatively small ones, the thrust unit is often mounted in rigid fashion in the stern region of the deck and the weight concentrated there.

The rigid thrust unit of this design is equipped with one or more rudders for steering, with which the generated air current must be deflected, this entailing high frictional losses. Another design involves several rigid thrust units, which control the direction of travel by individually controlling the airscrew rotational speed of each individual thrust unit. In both hovercraft designs, the motor is close to the rigidly mounted thrust unit(s) and thus concentrates even more weight in the stern region of the hovercraft. In order to achieve the required uniform weight distribution in this case, a ballast system, such as a tank for holding ballast water, must be provided in the bow region. This further increases the weight, gives the hovercraft very high inertia and reduces the useable space.

In order to manoeuvre, a torque must be induced in the known hovercraft with a rigid thrust unit. This torque steers the craft in the desired direction. In this respect, the manoeuvrability is similar to that of a ship. Due to the high inertia of the hovercraft and the low resistance of the air to the motion of the craft, however, turning can only be stopped by applying a torque in the opposite direction. The high inertia of the craft again has a disadvantageous effect in this context.

The above designs also have disadvantages in terms of fluid dynamics, particularly during forward travel, as the motor provided in the vicinity of the thrust unit hinders the flow of air on the intake side of the airscrew in this case. In addition, a mechanical driveline that links the drive motor to the air screw must be provided. It consists, for example, of shafts, joints, gears, clutches, etc. that also add to the weight of the craft and thus increase its inertia.

Among larger hovercraft, such as large hovercraft ferries, there is a known design with thrust units that are designed to pivot about a vertical axis. In this case, the air current can be turned in the desired direction in order to steer. The pivoting thrust units are referred to below as "pivoting units". They have drive shafts arranged parallel to, or even along, the vertical pivoting axis of the pivoting unit. The drive shaft is driven by a separate motor via an angular gearbox or the like and, in turn, drives the airscrew via another angular gearbox. The motors and additional angular gearboxes increase and concentrate the weight in the area of the pivoting unit.

In order to reduce the weight, the drive energy of a single motor could be fed to several pivoting units. However, this would entail the disadvantage that the drivelines would greatly restrict the useable space.

Depending on how many pivoting units are provided and where, an additional ballast system must also be provided in this design in order to achieve uniform weight distribution throughout the craft.

In relatively small hovercraft, the use of heavy pivoting units with separate motors is dispensed with due to the great weight and the problems with weight distribution.

In order to decelerate the known hovercraft, it is necessary to reverse the direction of the air current. For example, this can be achieved in the known fashion by reversing the sense of rotation of the airscrew, this having the disadvantage that the airscrew must be first brought to a standstill and then accelerated in the opposite rotational direction. Another solution provides for the adjustment of the airscrew blades, where the air current is reversed while the airscrew continues to rotate in the same direction. This, however, requires a mechanically complex adjusting mechanism to adjust the airscrew blades.

The object of the invention is to design a hovercraft that can be operated with a little expenditure of energy and has good manoeuvrability, good space utilisation and a high payload relative to its weight.

According to the invention, the object is solved in that the motor takes the form of an electric motor located directly on the airscrew, and in that at least one central energy generator, which supplies the electric motor with drive energy via an energy line, is provided in order to generate the electrical drive energy required by said electric motor.

This measure creates a hovercraft, the useable space of which is not restricted by a driveline and which therefore has particularly good space utilisation. The energy line is provided in the form of an electrical line, which feeds the drive energy to the electric motor. It is considerably lighter than a mechanical driveline and is laid such that it does not restrict the useable space of the hovercraft.

As a result of technical advancements in the field of electrical machines and controllers, electric motors and generators are available that have a very high power density relative to their weight. Only this new drive technology makes it possible to provide an electric motor directly on the airscrew. With this design, the thrust unit is particularly light and requires only little installation space.

As a result of this new method, thrust units can be mounted at various locations on the hovercraft, such as on the roof of the hovercraft, which is favourable in terms of fluid dynamics. The previous design problems, namely uniform weight distribution throughout the craft, can now easily be solved. Steering by means of a rudder, and the associated efficiency loss in propulsion, can be dispensed with. The ballast system is only required to compensate for unevenly distributed cargo and can be of a much smaller and lighter design. The central energy generator can be positioned at a favourable location. For example, it is possible to compensate for a slight imbalance in a hovercraft provided with two, light stern pivoting units by placing the energy generator in a suitable position to act as counter-ballast. The hovercraft thus has less inertia and is easy to manoeuvre. In addition, the payload and useable space of the craft are increased.

With the proposed invention, the propulsion power can be controlled very easily by regulating the rotational speed of the airscrew. As the airscrew is driven by an electric motor, there is no need for complex and very heavy gears to change the rotational speed, which can be controlled in infinitely variable fashion and very precisely. In addition, the airscrew need not be designed with adjustable airscrew blades to regulate the propulsion power.

Decelerating the hovercraft by reversing the direction of the air flow is also possible with the known methods when using electric motors to drive the airscrew, namely by reversing the sense of rotation of the airscrew or adjusting the airscrew blades while the sense of rotation of the airscrew remains the same. With the new hovercraft, however, deceleration can also be simply performed by rotating the pivoting unit through 180° and the complex methods described above can be dispensed with. No mechanical driveline has to be pivoted at the same time and pivoting can thus be achieved with very little design effort.

In order to prevent the thrust of the pivoting unit from turning the hovercraft during pivoting, a pair of pivoting units or a multiple number of pivoting unit pairs are advantageously provided. One pivoting unit of a pair then pivots through 180° about its vertical axis in the one pivoting direction and the other by 180° in the opposite pivoting direction. The torques generated by the air current during pivoting act in opposite directions and cancel each other out. The hovercraft does not turn. Pivoting can take place at the maximum rotational speed of the airscrew. It is thus possible to switch from propulsion to deceleration in a very short time.

The energy generator expediently has a modern generator driven by a drive motor. The generator and the drive motor of the energy generator are preferably combined in a compact assembly, so that heavy and space-wasting drive elements for connecting these two components can again be eliminated. The energy generator is preferably the central energy supply unit for all electric motors. It can be located anywhere on the hovercraft. This allows extensive design freedom and thus makes it possible to considerably increase the payload and the useable space compared to known hovercraft.

The drive energy can be fed to the pivoting electric motor via electrical sliding contacts, flexible cables or other suitable means. In this way, a pivoting unit can be designed to pivot through more than 360°.

The energy generator can have a compact drive motor in the form of a turbine linked to a modern generator. The turbine is considerably lighter than a diesel engine, for example. Unlike a diesel engine, which drives the airscrew directly, it can also be continuously operated under optimum conditions. This means that it can operate at the most favourable rotational speed and under the most favourable torque load.

Of course, a simple combustion engine, such as a two-stroke or four-stroke piston engine, for an advantageous fuel can also be used as a drive motor in a simple configuration.

In order to rapidly move the pivoting unit about its vertical axis into a desired pivoting position, it is equipped with a separate pivoting drive. This is also expediently equipped with an electric drive motor and a suitable mechanical adjusting device.

One configuration of the hovercraft has at least one pivoting unit. It is used both to propel and steer the craft.

Two pivoting units are preferably provided, these being arranged in the direction of the lateral principal axis of inertia of the hovercraft, as well as mirror-symmetrical to its longitudinal principal axis of inertia. Due to its particularly favourable distribution of weight to the sides, this arrangement affords outstanding stability in the hovering state. Due to the thrust impulse acting in the lateral principal axis of inertia, the manoeuvrability is excellent and particularly efficient for straight travel in a pivoting position parallel to the longitudinal principal axis of inertia. In the manner of a motor vehicle with all-wheel steering, the hovercraft can travel straight ahead at an angle $\alpha$ to its longitudinal principal axis of inertia. This makes it possible to control the direction without having to steer the hovercraft into the desired direction of travel, as with a ship. Due to the fact that the craft need not be turned into its direction of travel, nor this turning stopped by counter-steering with a torque in the opposite direction, very good manoeuvrability is provided, where the inertia of the craft is not very noticeable. The hovercraft can be precisely steered and requires little room to manoeuvre.

Another configuration is expediently equipped with two rigid thrust units, which are exclusively used to provide propulsion. In this case, at least one thrust unit is designed as a steering unit, which is exclusively used for steering. This special design has the advantage that manoeuvring is handled via a single steering unit, whose pivoting position determines the direction of travel.

In the design with just one steering unit, it is mechanically favourable for the steering unit to be mounted on the stern in vertically pivoting fashion above the longitudinal principal axis of inertia, as the induced thrust vector of the steering unit can generate a maximum torque for directional control.

The steering unit is equipped with a pivoting drive for easy pivoting about its vertical axis. It is also expediently provided with an electric drive motor and a suitable mechanical adjusting device.

In an alternative configuration of the hovercraft, both the stern and the bow are provided with at least one pivoting unit. This special design permits the generation of maximum torques for directional control by both the stern pivoting unit and the bow pivoting unit, which further improves manoeuvrability. With this design, the hovercraft can again travel straight ahead, in the manner of a motor vehicle with all-wheel steering, at an angle $\alpha$ to its longitudinal principal axis of inertia. The pivoting units on the stern and bow are preferably mounted above the longitudinal principal axis of inertia.

The pivoting position of all of the pivoting and steering units is preferably individually controllable. This permits the greatest possible degree of variation for changing direction during a manoeuvre. The variety of pivoting positions that the individual pivoting units can take up relative to one another should, however, be reduced to those that are advantageous for steering the hovercraft. This can be achieved by mechanical means or simply by program-assisted control of the pivoting drives. In this way, the driver can easily control the hovercraft.

The thrust units designed as pivoting and/or steering units, as well as the lift fan, are all preferably driven individually at the desired rotational speed of the airscrews. However, the possible rotational speed combinations of the individual airscrews relative to one another should be reduced to those combinations that are advantageous for steering the hovercraft, so that the driver can easily control the craft. To this end, a program-assisted controller can again be provided that links the allocation of the individual rotational speeds of several thrust or steering units.

In order to enable automatic correction of the pivoting position of the pivoting and/or steering units, a crosswind gauge can be provided that records the crosswind component measured. This can be analysed for the purpose of automatically adjusting the pivoting position of the pivoting and/or steering units required for straight travel, or, in the case of rigid thrust units, influence the required thrust distribution or the rudder position.

Another advantage is the fact that the hovercraft according to the invention can very easily be steered with the help of a program-assisted autopilot.

The airscrew of the pivoting and/or steering unit is advantageously shrouded. The airscrew blades are preferably mounted on the airscrew hub in rigid fashion.

Figure 2:
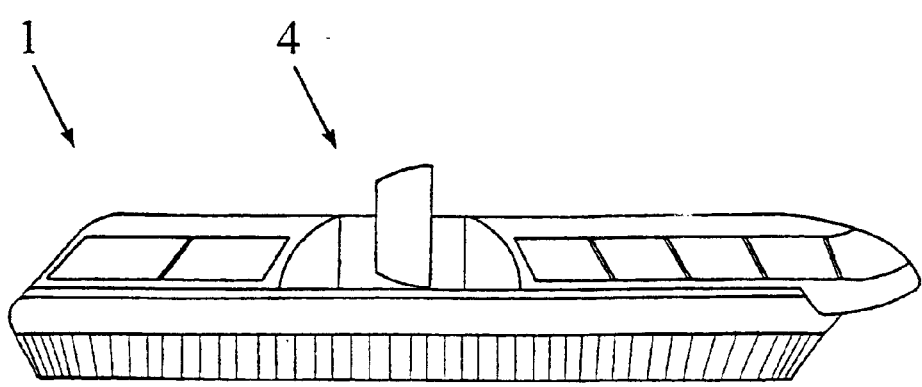
Figure 5:
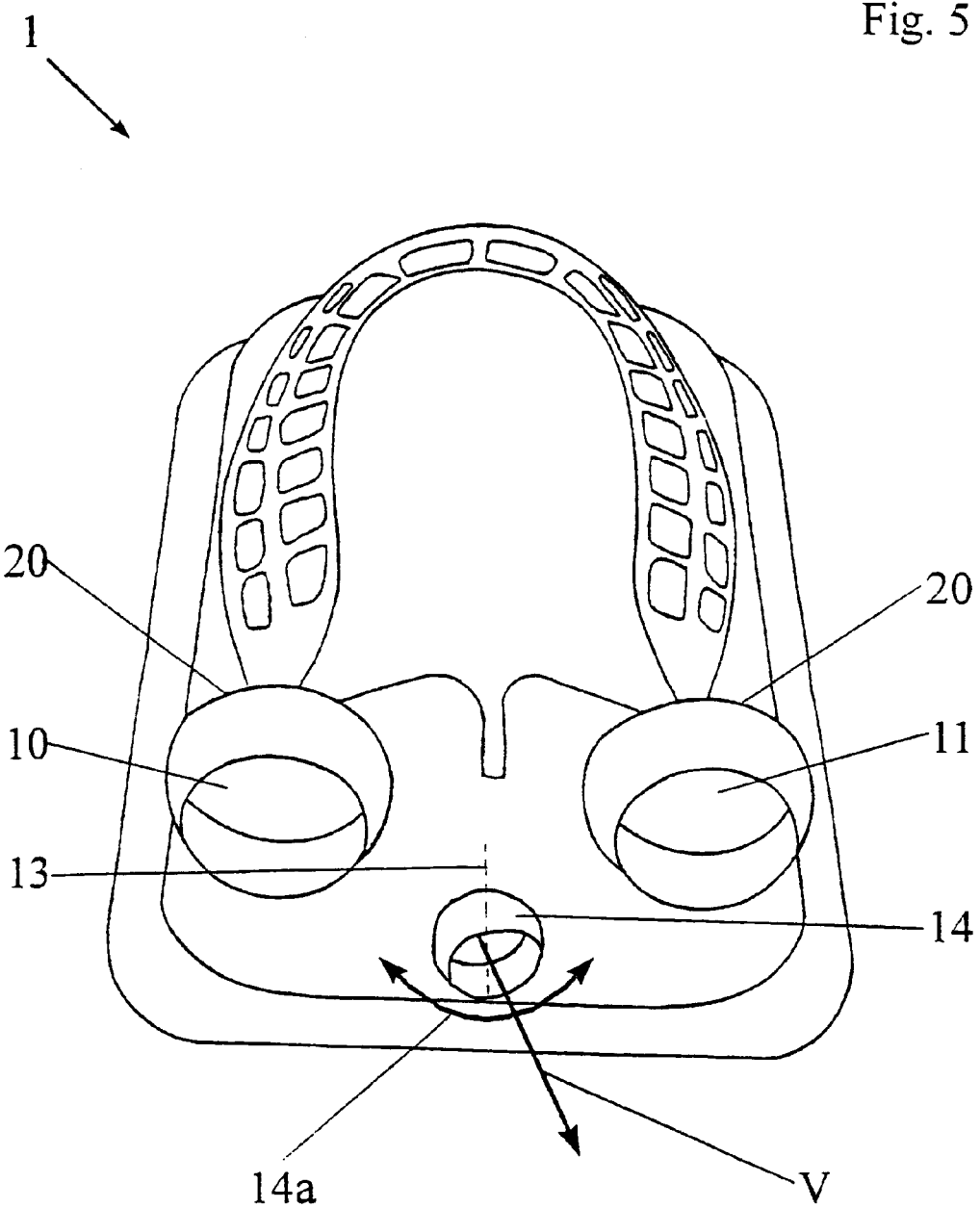
Figure 6:
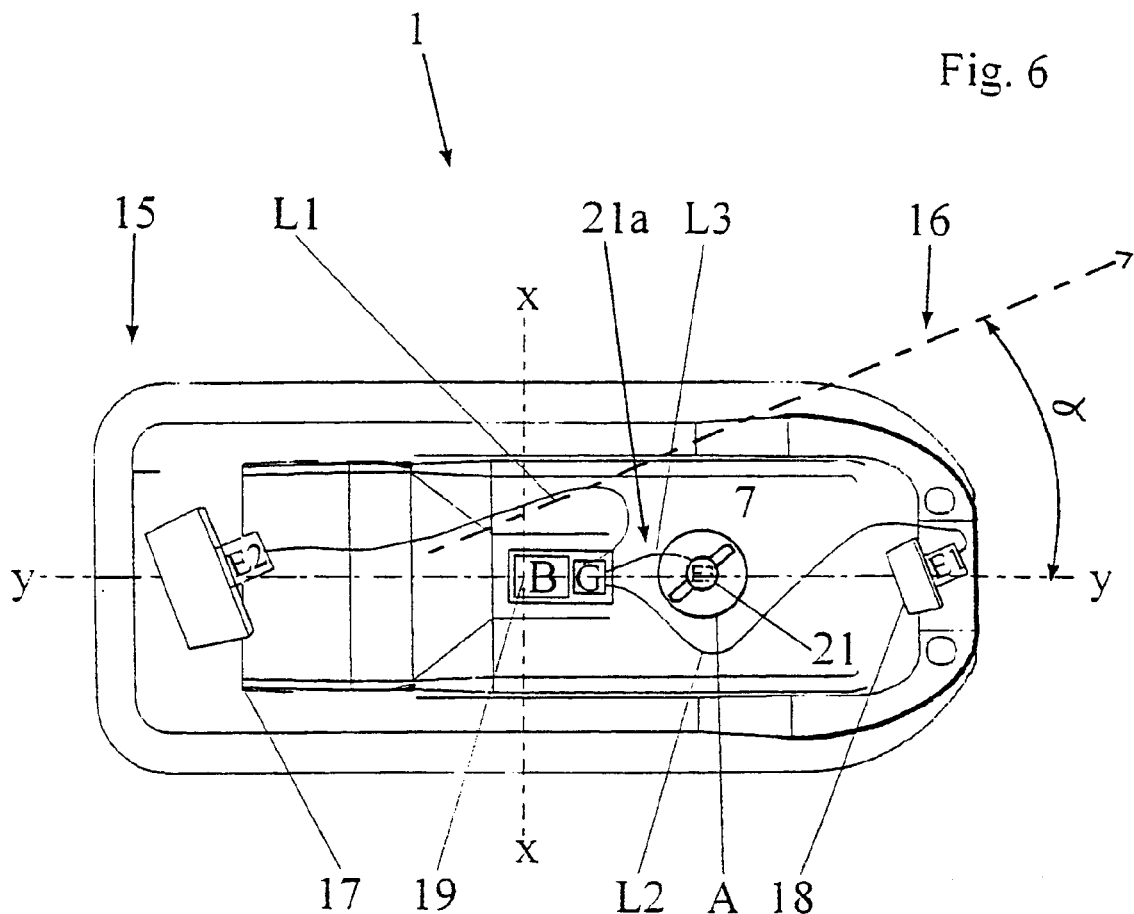
Figure 7:
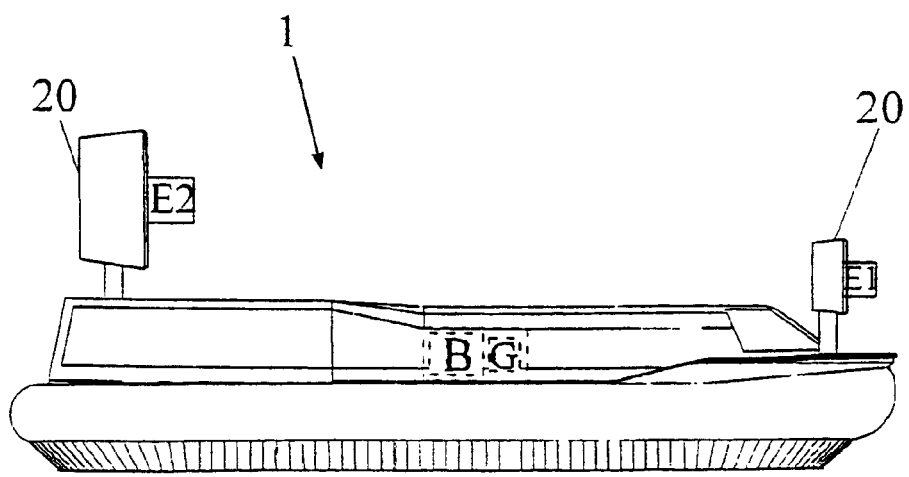

An example of the invention is illustrated below in the drawing and explained in detail based on the figures. The figures show the following:

FIG. 1 A top view of a configuration of the hovercraft with two pivoting units arranged in the direction of the lateral, and mirror-symmetrical to the longitudinal principal axis of inertia, FIG. 2 A side view of the hovercraft according to FIG. 1, FIG. 3 A top view of the hovercraft according to FIG. 1 during straight travel at an angle α to the longitudinal principal axis of inertia, FIG. 4 A top view of the hovercraft according to FIG. 1 during a turn about a vertical axis, FIG. 5 A perspective view of another configuration of the hovercraft with a thrust unit designed as a steering unit for directional control, FIG. 6 A top view of a configuration of the hovercraft, the stern and bow of which are both provided with a pivoting unit, FIG. 7 A top view of the hovercraft according to FIG. 6.

According to FIG. 1, hovercraft 1 comprises a lift fan A for producing an air cushion and two thrust units designed as pivoting units 2 and 3 which act on the top surface 4 of the craft. Pivoting units 2 and 3 can pivot about their vertical axes 2a and 3a. They are used for the propulsion and directional control of the craft and are arranged both in the direction of the lateral principal axis of inertia x—x of the hovercraft, as well as mirror-symmetrical to its longitudinal principal axis of inertia y—y. Lift fan A and the thrust units each have airscrews (not shown), each of which is driven by one of motors 5, 6 and 21 and generates an air current. Motors 5, 6 and 21 are located directly on the airscrews. In order to generate the drive energy required by motors 5, 6 and 21, a central energy generator 7 is provided that supplies motors 5, 6 and 21 with drive energy via energy lines 5a, 6a and 21a. Pivoting units 2 and 3 can pivot about vertical axes 2a and 3a by means of a pivoting drive not shown here. Motors 5, 6 and 21 are designed as electric motors E1, E2 and A and energy lines 5a, 6a and 21a as electrical lines L1, L2 and L3. These are considerably lighter than a mechanical driveline. They are only shown schematically here. As electrical lines L1, L2 and L3 require only very little space and can be laid in almost any configuration, the useable space of the hovercraft is hardly restricted at all.

Due to its particularly favourable distribution of weight to the sides, the arrangement of the pivoting units according to FIG. 1 affords outstanding stability in the hovering state. Due to the thrust impulse acting on the lateral principal axis of inertia x—x, the manoeuvrability is excellent and particularly efficient for straight travel when in a parallel pivoting position. In the manner of a motor vehicle with all-wheel steering, the hovercraft can, as shown in FIG. 3, travel straight ahead at an angle a to its longitudinal principal axis of inertia y—y. As shown by the arrow drawn around vertical axis 8 in FIG. 4, it is possible to turn the hovercraft in its current hovering position by making a pivoting motion, e.g. by turning pivoting unit 3 through 180°.

The useable space of the hovercraft is not restricted by a driveline and the space utilisation is therefore particularly good.

Energy generator 7 is positioned at the centre of the hovercraft and equipped with a drive motor B and a generator G, which serves to generate the electrical drive energy for electric motors E1 and E2. The weight distribution is very uniform with this arrangement. Energy generator 7 is combined with drive motor B and generator G to form a compact assembly. This can be optimally positioned when designing a hovercraft and the useable space thus maximised.

In the present configuration, compact drive motor B takes the form of a turbine that is lighter and smaller than a comparably powerful piston engine.

The configuration of the hovercraft according to FIG. 5 has two rigid thrust units 10 and 11, which are exclusively used to provide propulsion. An additional thrust unit is provided in the form of steering unit 14, which, as indicated by arrow 14a, can pivot about its vertical axis 13. It is exclusively used for steering the hovercraft. This special design has the advantage that manoeuvring is handled via a single steering unit 14, whose pivoting position determines the direction of travel. A pivoting drive (not shown) is again provided here to pivot steering unit 14.

In the design with just one steering unit 14, it is mechanically particularly favourable for steering unit 14 to be mounted on the stern 15 above the longitudinal principal axis of inertia y—y, as the induced thrust vector V of the steering unit can generate a maximum torque for directional control.

In an alternative configuration of the hovercraft, the stern 15 and the bow 16 are each provided with one pivoting unit 17 and 18. This special design permits the generation of maximum torques for directional control by both the stern pivoting unit 17 and the bow pivoting unit 18, which further improves manoeuvrability. With this design, the hovercraft can again travel straight ahead, in the manner of a motor vehicle with all-wheel steering, at an angle α to its longitudinal principal axis of inertia. The pivoting of stern pivoting unit 17 through 90° and of bow pivoting unit 18 through minus 90°, for example, also makes it possible with this configuration to turn the hovercraft about vertical axis 19, precisely at its current hovering position.

Pivoting units 17 and 18 on stern 15 and bow 16 are mounted above the longitudinal principal axis of inertia y—y. Bow pivoting unit 18 is smaller than stern pivoting unit 17. It primarily serves the purpose of steering the craft. Stern pivoting unit 17 is essentially provided to propel the hovercraft.

The airscrew of the pivoting and/or steering unit is advantageously provided with a shroud 20.

Hovercraft

| | List of reference numbers |
|---|---|
| 1 | Hovercraft |
| 2 | Pivoting unit |
| 2a | Vertical axis |
| 3 | Pivoting unit |
| 3a | Vertical axis |
| 4 | Top surface of the craft |
| 5 | Motor |
| 5a | Energy line |
| 6 | Motor |
| 6a | Energy line |
| 7 | Energy generator |
| 8 | Vertical axis |
| 10 | Rigid thrust unit |
| 11 | Rigid thrust unit |
| 13 | Vertical axis |
| 14 | Steering unit |
| 14a | Arrow |
| 15 | Stern |

-continued

List of reference numbers

| | |
|---|---|
| 16 | Bow |
| 17 | Pivoting unit (stern) |
| 18 | Pivoting unit (bow) |
| 19 | Vertical axis |
| 20 | Shroud |
| 21 | Motor |
| 21a | Energy line |
| A | Lift fan |
| B | Drive motor |
| E1 | Electric motor |
| E2 | Electric motor |
| G | Generator |
| L1 | Electrical line |
| L2 | Electrical line |
| L3 | Electrical line |
| x-x | Lateral principal axis of inertia |
| y-y | Longitudinal principal axis of inertia |
| α | Angle |
| V | Thrust vector |

What is claimed is:

1. A hovercraft with at least one fan for producing an air cushion and at least one thrust unit, which acts on the top surface (4) of the craft, where the thrust unit serves to propel the craft and/or control its direction, and both the fan and the thrust unit have at least one airscrew that is driven by means of a motor (5, 6, 21) and generates an air current, characterised in that the motor (5, 6, 21) takes the form of an electric motor located directly on the airscrew, in that at least one central energy generator (7), which supplies the electric motor (E1, E2, A) with drive energy via an energy line (5a, 6a, 21a), is provided in order to generate the electrical drive energy required by said electric motor (E1, E2, A), in that at least one thrust unit is designed as a rotatable unit (2, 3), which can rotate about a vertical axis (2a, 3a) and is used for both propulsion and steering, and in that two rotatable units (2, 3) are provided, which are arranged in the direction of the lateral principal axis of inertia x—x of the hovercraft, as well as mirror-symmetrical to its longitudinal principal axis of inertia y—y.

2. The hovercraft as claimed in claim 1, characterised in that the energy generator (7) has a generator (G) driven by a drive motor (B).

3. The hovercraft as claimed in claim 1, characterised in that the energy generator (7) has a turbine as the drive motor (B).

4. The hovercraft as claimed in claim 1, characterised in that the energy generator (7) has a combustion engine as the drive motor (B).

5. The hovercraft as claimed in claim 1, characterised in that the rotatable unit is provided with a rotatable drive in order to rotate about its vertical axis.

6. The hovercraft as claimed in claim 1, characterised in that both the stern (15) and the bow (16) are provided with at least one rotatable unit (17, 18).

7. The hovercraft as claimed in claim 1, characterised in that the rotational speed of individual airscrews can be controlled individually.

8. The hovercraft as claimed in claim 1, characterised in that a crosswind gauge is provided, and in that the crosswind component measured can be used to correct the steering.

9. The hovercraft as claimed in claim 1, characterised in that the airscrew is shrouded.

10. The hovercraft as claimed in claim 1, characterised in that the individual airscrew blades are mounted on the airscrew hub in rigid fashion.

11. A hovercraft with at least one fan for producing an air cushion and at least one thrust unit, which acts on the top surface (4) of the craft, where the thrust unit serves to propel the craft and/or control its direction, and both the fan and the thrust unit have at least one airscrew that is driven by means of a motor (5, 6, 21) and generates an air current, characterised in that the motor (5, 6, 21) takes the form of an electric motor located directly on the airscrew, in that at least one central energy generator (7), which supplies the electric motor (E1, E2, A) with drive energy via an energy line (5a, 6a, 21a), is provided in order to generate the electrical drive energy required by said electric motor (E1, E2, A), in that two rigid thrust units (10, 11) are provided, which are exclusively used to provide propulsion, and in that at least one thrust unit is designed as a rotatable unit (14), which is rotatable about a vertical axis (13) and is exclusively used for steering, and in that the rotatable unit (14) is mounted on the hovercraft stern (17) above the hovercraft longitudinal principal axis of inertia y—y.

12. The hovercraft as claimed in claim 11, characterised in that the rotatable unit is provided with a rotatable drive in order to rotate about its vertical axis.

13. The hovercraft as claimed in claim 11, characterised in that a crosswind gauge is provided, and in that a crosswind component measured can be used to correct the steering.

14. A hovercraft with at least one fan for producing an air cushion and at least one thrust unit, which acts on the top surface (4) of the craft, where the thrust unit serves to propel the craft and/or control its direction, and both the fan and the thrust unit have at least one airscrew that is driven by means of a motor (5, 6, 21) and generates an air current, characterised in that the motor (5, 6, 21) takes the form of an electric motor located directly on the airscrew, in that at least one central energy generator (7), which supplies the electric motor (E1, E2, A) with drive energy via an energy line (5a, 6a, 21a), is provided in order to generate the electrical drive energy required by said electric motor (E1, E2, A), and in that a crosswind gauge is provided, and in that a crosswind component measured can be used to correct the steering.

15. A hovercraft with at least one fan for producing an air cushion and at least one thrust unit, which acts on the top surface (4) of the craft, where the thrust unit serves to propel the craft and/or control its direction, and both the fan and the thrust unit have at least one airscrew that is driven by means of a motor (5, 6, 21) and generates an air current, characterised in that the motor (5, 6, 21) takes the form of an electric motor located directly on the airscrew, in that at least one central energy generator (7), which supplies the electric motor (E1, E2, A) with drive energy via an energy line (5a, 6a, 21a), is provided in order to generate the electrical drive energy required by said electric motor (E1, E2, A), in that at least one thrust unit is designed as a rotatable unit (17, 18), which can rotate about a vertical axis and is used for both propulsion and steering, and in that both the stern (15) and the bow (16) are provided with at least one rotatable unit (17, 18).

\* \* \* \* \*